United States Patent
Patel et al.

(10) Patent No.: US 9,602,427 B2
(45) Date of Patent: Mar. 21, 2017

(54) CLOUD SERVICE EMBEDDING WITH SHARED PROTECTION IN SOFTWARE-DEFINED FLEXIBLE-GRID OPTICAL TRANSPORT NETWORKS

(71) Applicant: NEC Laboratories America, Inc., Princeton, NJ (US)

(72) Inventors: Ankitkumar Patel, Monmouth Junction, NJ (US); Philip Ji, Cranbury, NJ (US)

(73) Assignee: NEC Corporation (JP)

( * ) Notice: Subject to any disclaimer, the term of this patent is extended or adjusted under 35 U.S.C. 154(b) by 190 days.

(21) Appl. No.: 14/547,732

(22) Filed: Nov. 19, 2014

(65) Prior Publication Data

US 2015/0220740 A1    Aug. 6, 2015

Related U.S. Application Data

(60) Provisional application No. 61/936,371, filed on Feb. 6, 2014.

(51) Int. Cl.
| | |
|---|---|
| *G06F 15/173* | (2006.01) |
| *H04L 12/911* | (2013.01) |
| *H04L 29/08* | (2006.01) |
| *G06F 21/57* | (2013.01) |
| *H04L 12/715* | (2013.01) |
| *H04L 12/735* | (2013.01) |

(52) U.S. Cl.
CPC .......... *H04L 47/728* (2013.01); *G06F 21/577* (2013.01); *H04L 45/64* (2013.01); *H04L 67/10* (2013.01); *H04L 45/1287* (2013.01)

(58) Field of Classification Search
CPC .................................................... H04L 47/728
See application file for complete search history.

(56) References Cited

U.S. PATENT DOCUMENTS

| | | | |
|---|---|---|---|
| 2003/0018812 A1* | 1/2003 | Lakshminarayana | ... H04L 45/12 709/241 |
| 2010/0195535 A1 | 8/2010 | Ziller et al. | |
| 2011/0029675 A1* | 2/2011 | Yeow | ... G06F 11/2041 709/226 |
| 2014/0099118 A1* | 4/2014 | Zhang | ... H04J 14/0257 398/79 |

(Continued)

OTHER PUBLICATIONS

Zhu Y., et al., 2006, Algorithms for assigning substrate network resources to virtual network components.*

(Continued)

*Primary Examiner* — Yves Dalencourt
(74) *Attorney, Agent, or Firm* — Joseph Kolodka (57) ABSTRACT

A method and apparatus are provided for embedding cloud demands with shared protection in a software-defined flexible-grid optical transport network. The method includes mapping working virtual nodes of the cloud demands over physical nodes of the network. The method further includes mapping backup virtual nodes of the cloud demands over the physical nodes. The method also includes mapping working virtual links of the cloud demands over physical routes of the network. The method additionally includes mapping backup virtual links of the cloud demands over the physical routes. The mapping steps are performed by an optical-defined controller having a processor.

18 Claims, 6 Drawing Sheets

(56) References Cited

U.S. PATENT DOCUMENTS

| | | | |
|---|---|---|---|
| 2014/0099119 A1* | 4/2014 | Wei | H04J 14/0257 398/79 |
| 2015/0104172 A1* | 4/2015 | Wang | H04J 14/0254 398/58 |
| 2016/0072608 A1* | 3/2016 | Wright | H04J 14/0241 398/49 |

OTHER PUBLICATIONS

Ye Z., et al., 2013, Virtual Infrastructure embedding over software-defined flex-grid optical networks.*

Guo T., et al., 2011, Shared backup network provision for virtual network embedding.*

Guo B., et al., 2013, survivable virtual network design and embedding to survive a facility node failure.*

Zilong Ye et al., 'Virtual infrastructure embedding over software-defined flex-grid optical networks,' In: Proceeding of GlobeCom Workshops (GC WKshps), 2013 IEEE, Atlanta, pp. 1204-1209, Dec. 13, 2013. See p. 1204, right column, lines 21-26; p. 1205, left column, lines 45-50; p. 1206, left column, lines 15-41, right column, lines 10-19; p. 1207, right column, lines 1-8, 47-49; p. 1209, left column, lines 2-6; and figure 1.

Habib, M., et al. "Fault-Tolerant Virtual Network Mapping to Provide Content Connectivity in Optical Networks" Optical Fiber Communication Conference. Mar. 2013. (3 Pages).

Ji, P. "Software Defined Optical Network" 11th International Conference on Optical Communications and Networks (ICOCN). Nov. 2012. (4 Pages).

McKeown, N., et al. "OpenFlow: Enabling Innovation in Campus Networks" ACM SIGCOMM Computer Communication Review. vol. 38. No. 2. Apr. 2008. pp. 69-74.

Patel, A., et al. "QoS-Aware Optical Burst Switching in OpenFlow Based Software-Defined Optical Networks" 17th International Conference on Optical Network Design and Modeling (ONDM). Apr. 2013. pp. 275-280.

Qiao, C., et al. "A Novel Two-Step Approach to Surviving Facility Failures" Optical Fiber Communication Conference and Exposition and the National Fiber Optic Engineers Conference (OFC/NFOEC). Mar. 2011. (3 Pages).

Rahman, M. et al. "SVNE: Survivable Virtual Network Embedding Algorithms for Network Virtualization" IEEE Transactions on Network and Service Management, vol. 10, No. 2. Jun. 2013.

Ye, Z., et al. "Survivable Virtual Infrastructure Mapping over Transport Software-Defined Networks (T-SDN)" Optical Fiber Communication Conference. Mar. 2014. (3 Pages).

Yu, H., et al. "Migration based Protection for Virtual Infrastructure Survivability for Link Failure" Optical Fiber Communication Conference. Mar. 2011. pp. 1-3.

* cited by examiner

CLOUD SERVICE EMBEDDING WITH SHARED PROTECTION IN SOFTWARE-DEFINED FLEXIBLE-GRID OPTICAL TRANSPORT NETWORKS

RELATED APPLICATION INFORMATION

This application claims priority to provisional application Ser. No. 61/936,371 filed on Feb. 6, 2014, incorporated herein by reference.

BACKGROUND

Technical Field

The present invention relates to cloud computing, and more particularly to cloud service embedding with shared protection in software-defined flexible-grid optical transport networks.

Description of the Related Art

Several procedures have been proposed for the survivable virtual network mapping problem in Internet Protocol (IP) networks, but these solutions cannot be directly applicable for software-defined flexible-grid optical transport networks due to the additional optical physics-oriented constraints.

SUMMARY

These and other drawbacks and disadvantages of the prior art are addressed by the present principles, which are directed to cloud service embedding with shared protection in software-defined flexible-grid optical transport networks.

According to an aspect of the present principles, a method is provided for embedding cloud demands with shared protection in a software-defined flexible-grid optical transport network. The method includes mapping working virtual nodes of the cloud demands over physical nodes of the network. The method further includes mapping backup virtual nodes of the cloud demands over the physical nodes. The method also includes mapping working virtual links of the cloud demands over physical routes of the network. The method additionally includes mapping backup virtual links of the cloud demands over the physical routes. The mapping steps are performed by an optical-defined controller having a processor.

According to another aspect of the present principles, an apparatus is provided for embedding cloud demands with shared protection in a software-defined flexible-grid optical transport network. The apparatus includes an optical-defined controller having a processor configured to: map working virtual nodes of the cloud demands over physical nodes of the network; map backup virtual nodes of the cloud demands over the physical nodes; map working virtual links of the cloud demands over physical routes of the network; and map backup virtual links of the cloud demands over the physical routes.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to cloud service embedding with shared protection in software-defined flexible-grid optical transport networks.

In an embodiment, we provide a procedure that maps working virtual links and working virtual nodes such that the sharing of backup virtual nodes and backup virtual links is maximized.

A Software-Defined Network (SDN) architecture enables network programmability to support multi-vendor, multi-technology, multi-layer communications, and to offer an infrastructure as a service. Recently, efforts are being made to integrate optical transport within an Internet Protocol/Ethernet-based SDN architecture to leverage optical transmission benefits, such as low interference, long reach, and high capacity transmission with lower power consumption. Such a network is referred to as an optical transport SDN. An Optical transport SDN can be realized by enabling flexibility and programmability in transmission and switching network elements, such as transponders and ROADMs, management of optical channels, such as flexible-grid channel mapping, and extracting control plane intelligence from the physical hardware to a centralized controller.

Figure 1:
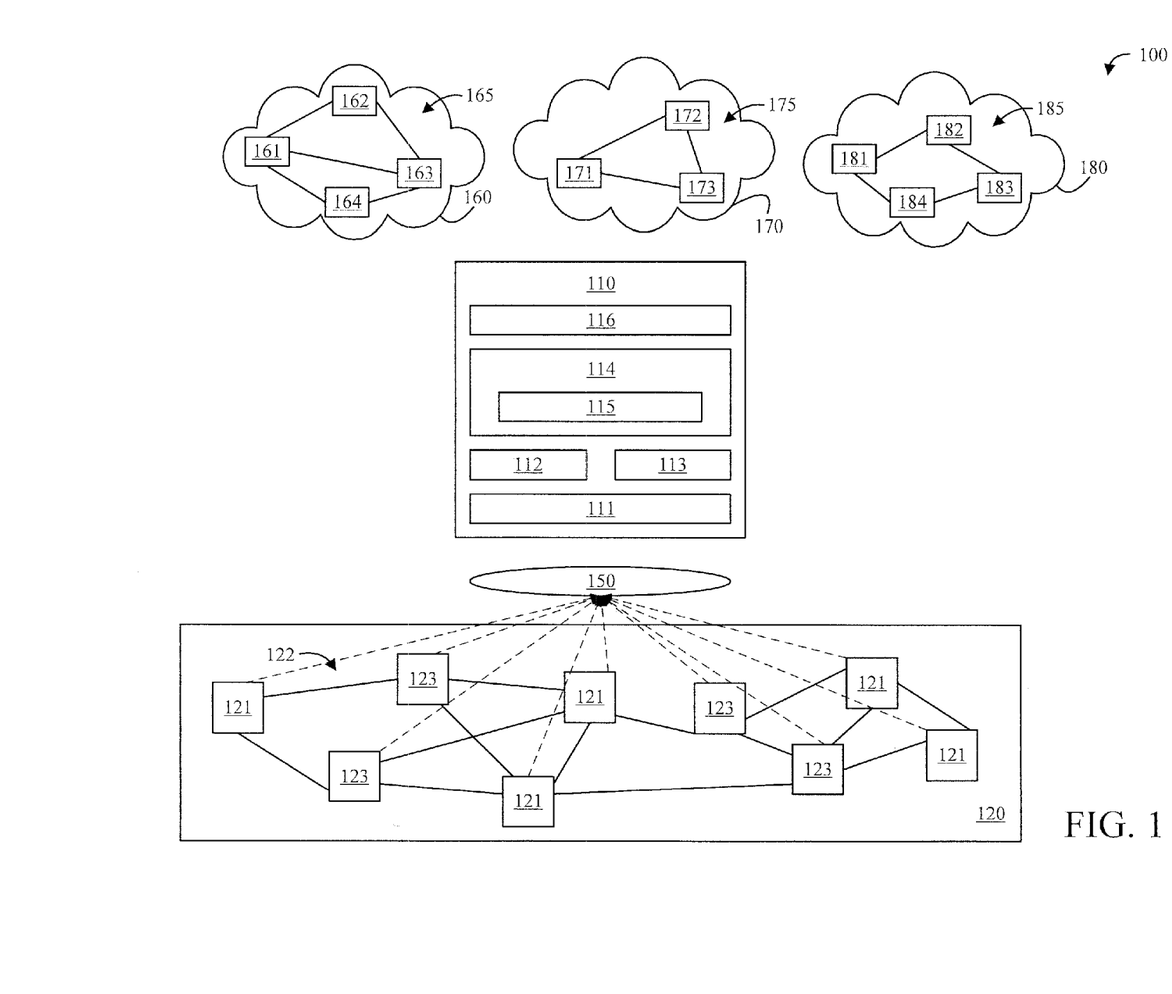
FIG. 1 shows an exemplary architecture for an optical transport Software-Defined Network (SDN) 100, in accordance with an embodiment of the present principles.
Figure 2:
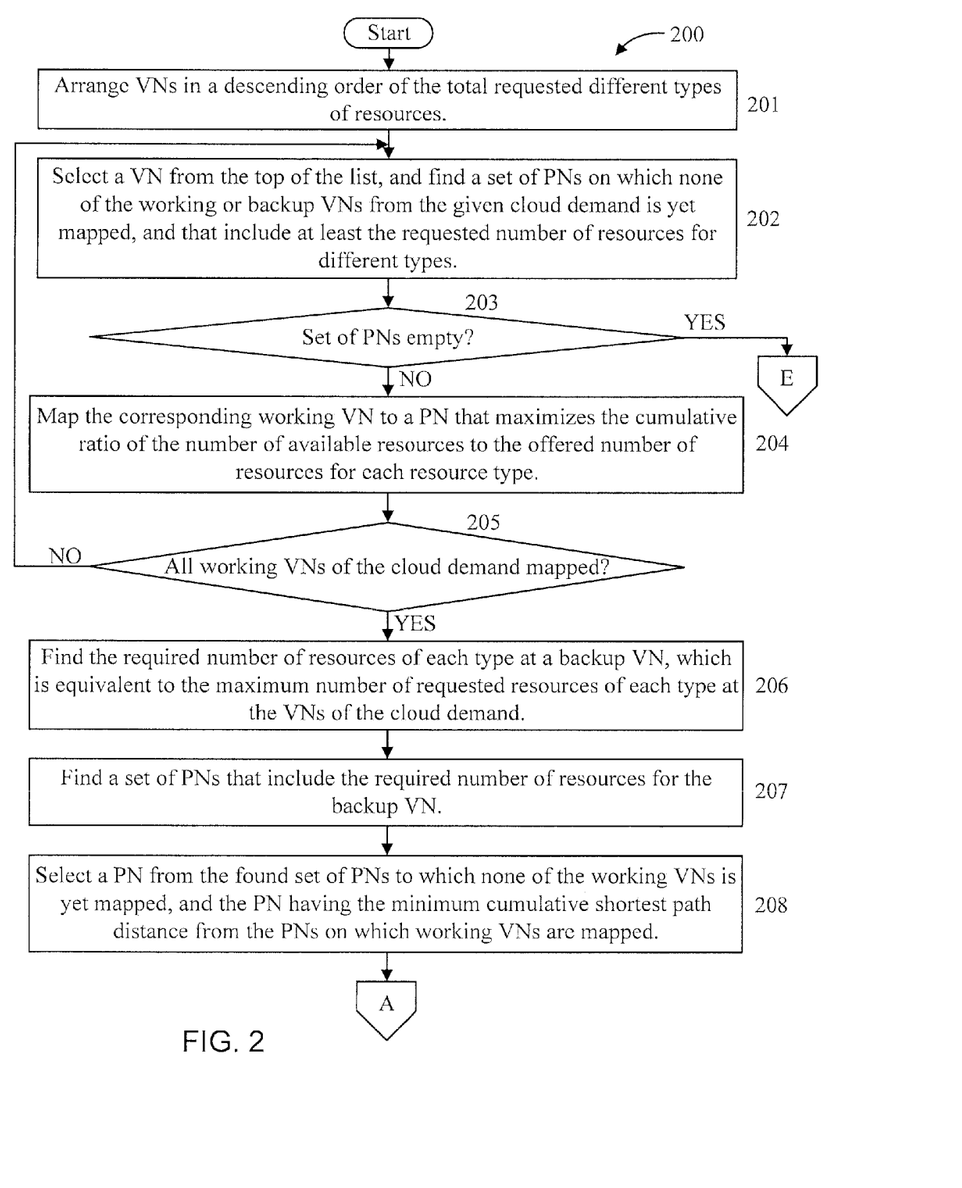
FIGS. 2-6 show an exemplary method 200 for cloud service embedding with shared protection in a software-defined flexible-grid optical transport network, in accordance with an embodiment of the present principles.
Figure 3:
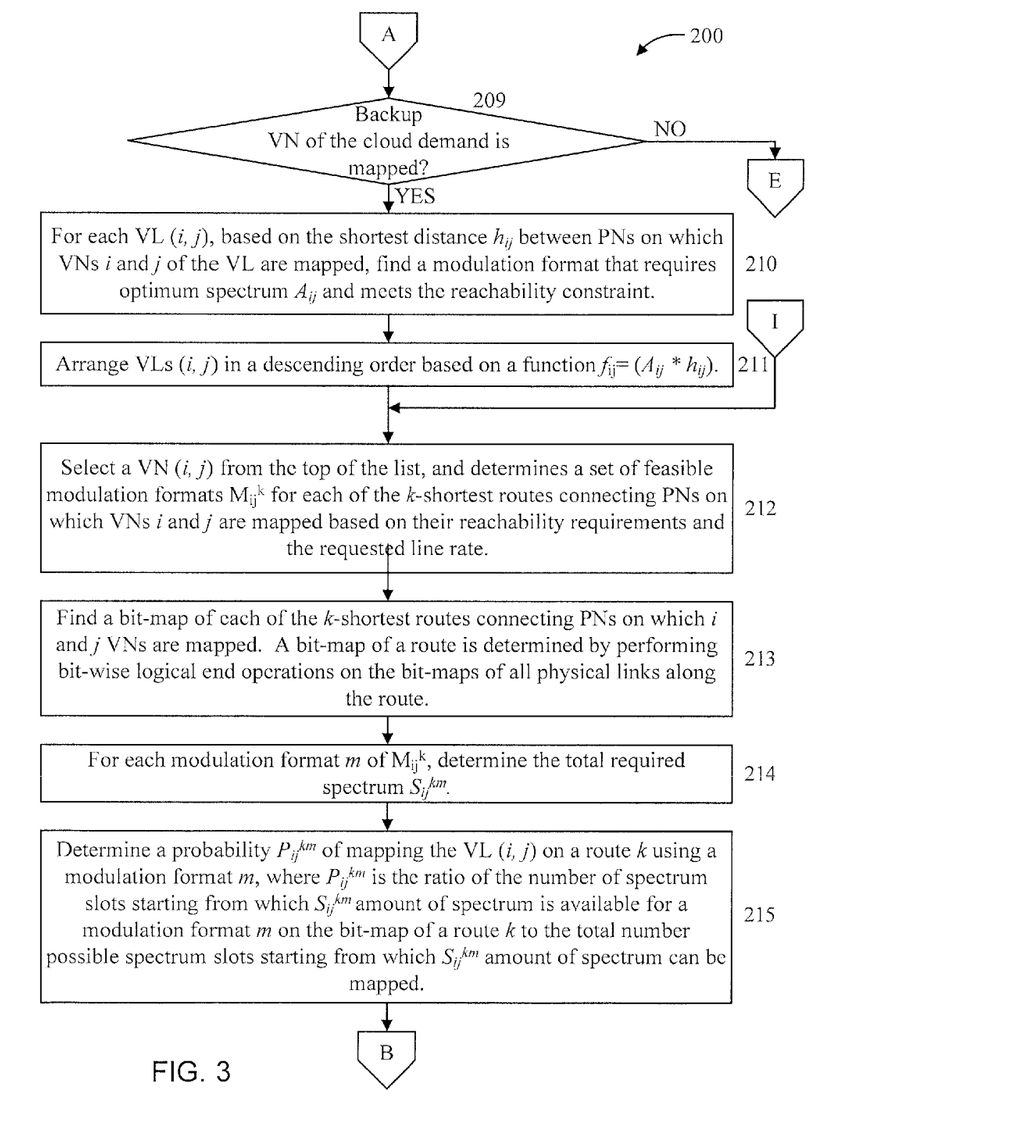
Figure 4:
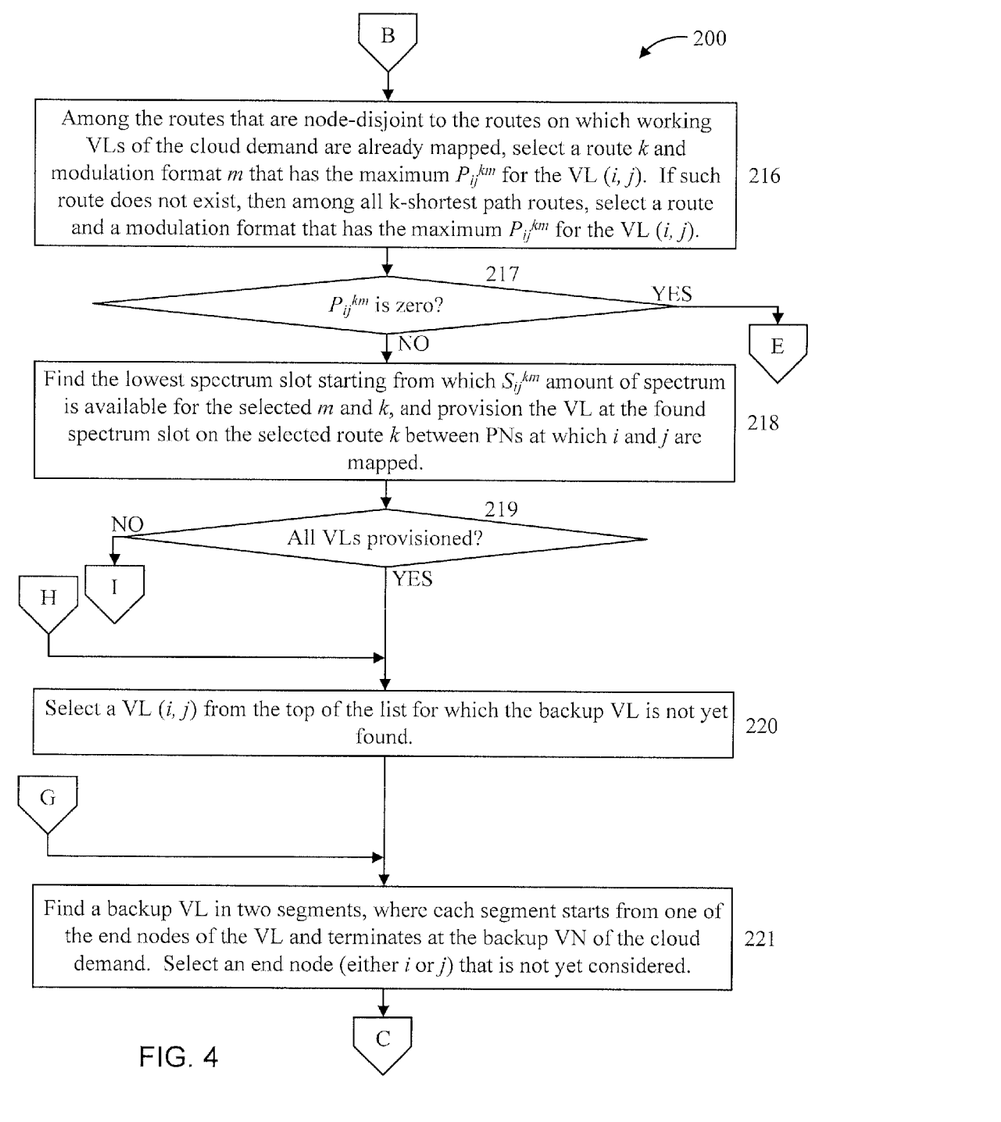
Figure 5:
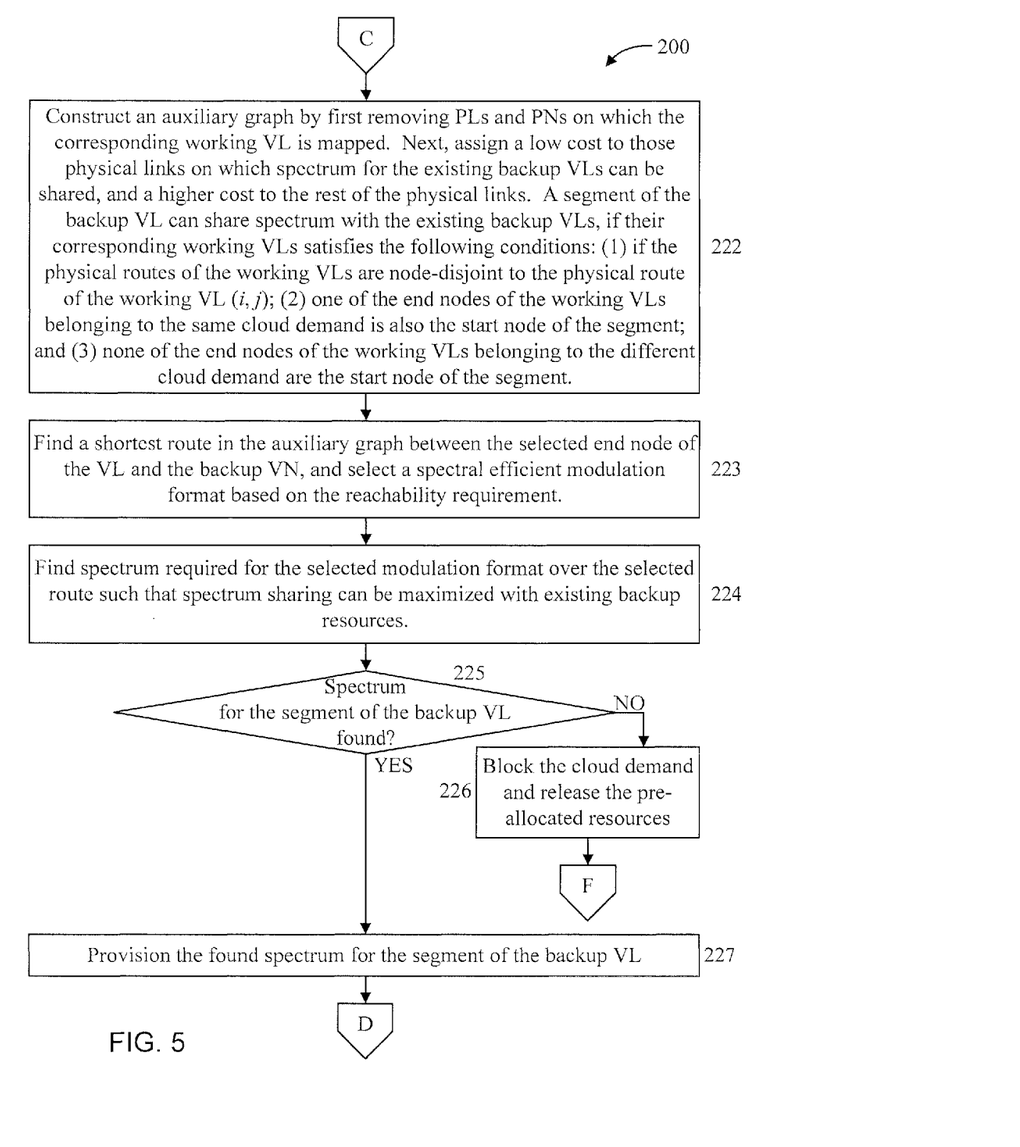
Figure 6:
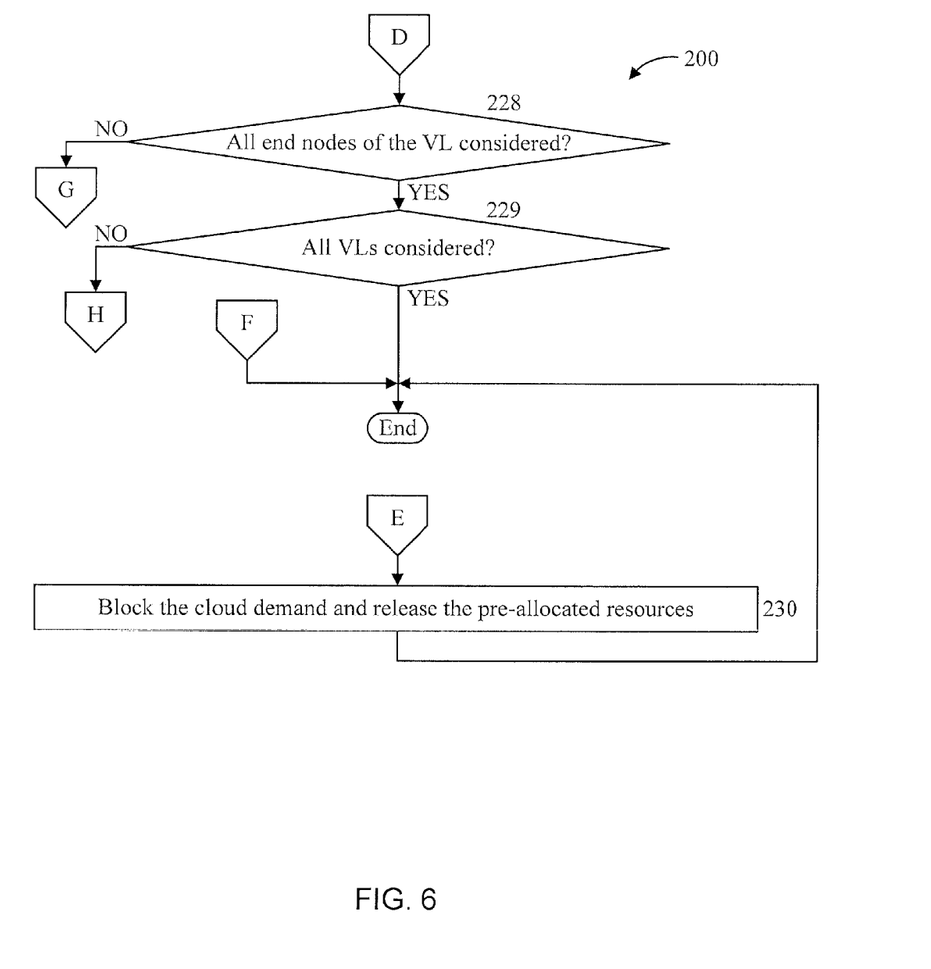

FIG. 1 shows an exemplary architecture 100 for an optical transport Software-Defined Network (SDN), in accordance with an embodiment of the present principles.

In the architecture, the control plane is abstracted from the physical hardware of the network elements (physical substrate), and most network control and management intelligence now resides into a centralized controller (also interchangeably referred to herein as an optics-defined controller (ODC)) 110. As used herein, optics-defined controller or ODC refers to a processor (e.g., a specialized processor) and a corresponding set of software modules that include control and management plane functions that are supported over virtualization-enabled (e.g., hypervisor) computing platforms (e.g. operating system) to operate, manage, and monitor optical WDM networks. The centralized controller 110 controls network elements using a standardized protocol 150, such as OpenFlow over standardized interfaces at a controller and network elements. The control plane decisions are represented in the form of rules, actions, and policies, and network elements applies these decision based on match-action operations on connections. Thus, an optical transport SDN partitions a network into software-defined optics (SDO) 120 and the optics defined controller (ODC) 110.

The optical transport SDN 100 interfaces with cloud demands, for example, cloud demand 160, cloud demand 170, and cloud demand 180. Cloud demand 160 includes virtual nodes 161, 162, 163, and 164, and virtual links 165. Cloud demand 170 includes virtual nodes 171, 172, and 173, and virtual links 175. Cloud demand 180 includes virtual nodes 181, 182, 183, and 184, and virtual links 185. Stated concisely, a cloud demand is a request for computing resources that are geographically distributed over different data centers and interconnected by networks. In an embodiment, a cloud demand is defined as G' (V, E, C, L), where V is a set of virtual nodes (VNs), E is a set of virtual links (VLs) connecting the virtual nodes, C is a set of requested resources ($C_i^1, C_i^2, \ldots, C_i^n$) at each virtual node i, and L is a set of requested line rates $l_{ij}$ between virtual nodes i and j. Cloud demands are described in further detail herein below.

The optics-defined controller 110 includes an operating system 111, a computing hypervisor 112, a network hypervisor 113, an Infrastructure As A Service (IAAS) manager 116, and an application and database portion 114 that includes a cloud service embedding application 115. In an embodiment, the cloud service embedding application 115 can be Suurballe-based. Of course, other types of cloud service embedding applications can also be used.

The software-defined optics 120 include variable rate transponders 121, flexible-grid channel mapping 122, and colorless-directionless-contentionless-gridless (CDCG) Reconfigurable Optical Add-Drop Multiplexers (ROADMs) 123. Variable-rate transponders can be programmed for various modulation formats and Forward Error Correction (FEC) coding. Thus, the transponders can offer variable transmission capacity for heterogeneous reach requirements. Flexible-grid channel mapping allows an assignment of flexible amount of spectrum to channels to achieve higher spectral efficiency by applying spectrum-efficient modulation formats and eliminating guard bands. CDCG-ROADM can be programmed to switch connections operating on any wavelength with any spectral requirement over any outgoing direction. Furthermore, connections can be added and dropped at a node without contentions. These hardware and their features establishes the foundations of transport SDN optimization and customization capabilities.

The optics-defined controller 110 manages the network, and performs network optimization and customization to utilize the flexibility of the SDO 120. The ODC functionalities are further extracted into network/compute hypervisor 113/112, operating system 111, network applications and database 114, and debugger and management planes (within the IAAS manager) 116. These planes are isolated by open standardized interfaces to allow simultaneous and rapid innovations at each layer independently. Various control plane functionalities, for example, cloud resource mapping, routing and resource allocation, protection and restoration, defragmentation, energy optimization, and so forth, are installed as applications and databases in the ODC 110. Network/compute hypervisor 113/112 offers virtualization by providing isolation and sharing functions to a data plane as well as an abstract view of network and computing resources while hiding physical layer implementation details to a controller in order to optimize and simplify the network operations. The operating system 111 offers a programmable platform for the execution of applications and hypervisors. The debugger and management plane offers access control and Quality of Service (QoS) management, while monitoring network performance, and performs fault isolation, localization, and recovery.

Recently, cloud services have gained a lot of interest since they support applications by sharing resources within existing deployed infrastructure instead of building new ones from scratch. Currently, network applications are becoming more and more cloud centric, for example social networking applications, such as Facebook®, Twitter®, and Google+®, e-science applications, such as Large Hadron Collider, content applications, such as NETFLIX®, and search applications, such as Google® and Baidu®. Cloud applications are supported by interconnecting various computing, storage, software, and platform-oriented resources within data centers through networks. Each data center is built with the goal of optimizing the type of services offered, for example Google's data center is built with the goal of efficient indexing of web pages and minimization of content search time, while Facebook's data center is built to offer maximum storage for user contents and efficient management and linking of these contents within user's social group, and Amazon's EC2 data center is built to offer faster computing time. Thus, one data center may not provide all types of resources, and may not optimally meet all the requirements of a cloud application. Furthermore, failures of any data center, any fiber, or even a ROADM node on which the cloud service is currently active may terminate the entire service. Thus, cloud services must be provisioned with resiliency for computing and network resources. Resiliency of network and computing resources can be provisioned through either a dedicated or shared protection. In a dedicated protection, the backup resources are dedicatedly pre-reserved for network and computing resources, and network and computing services are redundantly provisioned on these backup resources to offer fast switching time in the case of failures. However, in a dedicated protection, the requirement for backup resources is very high. Furthermore, these backup resource cannot be utilized to support additional traffic, thus the utilization of network and computing resources is poor. On the other hand, in a shared protection, backup resources are pre-reserved for network and computing resources; however, the network and computing services are not redundantly provisioned on these backup resources. Thus, backup resources can be shared among multiple network and computing resource. The shared protection reduces the requirement of backup resources and improves the utilization of network and computing resources.

In such scenarios, open challenges are how to map working and backup computing resources among data centers offering heterogeneous resources, and how to establish working and backup network connectivity between data centers such that backup resources can be shared. The problem is referred to as cloud service embedding with shared protection. The present principles address the cloud service embedding with shared protection problem over software-defined flexible grid transport SDN networks. The problem of cloud service embedding with shared protection is formally defined as follows.

We are given a physical network topology G(N, L), where N represents a set of physical nodes (PNs) and L represents a set of physical links (PLs) interconnecting physical nodes. Each node offers different types of resources, for example, 1, 2, 3, ..., n, and the number of offered resources $C_j^n$ on each node j is given in advance. A node also includes CDCG-ROADMs and variable rate transponders. CDCG-ROADM offers switching of flex-grid optical connections while variable rate transponders offer a set of modulation formats M, where the spectral efficiency $Z_m$ bit/second/Hz and transmission reach $D_m$ Km of each modulation format in is also given. A fiber offers a total T THz of spectrum. A cloud demand is defined as G' (V, E, C, L), where V is a set of virtual nodes (VNs), E is a set of virtual links (VLs) connecting virtual nodes, C is a set of requested resources ($C_i^1, C_i^2, C_i^n$) at each virtual node i, L is a set of requested line rate $l_{ij}$ between virtual nodes i and j. The arrival and departure distributions of cloud requests are given. The problem is how to map working and backup virtual nodes of a cloud demand over physical nodes (the virtual node embedding with shared protection problem) and working and backup virtual links of a cloud demand over physical links (the virtual link embedding with shared protection problem), such that the number of embedded cloud demands is maximized. The virtual link embedding with shared protection problem includes sub-problems such as how to route working and backup virtual links over physical node-disjoint routes, how to assign wavelengths and allocate spectrum, and how to select modulation formats while sharing backup network resources (spectrum). It is assumed that a network does not support wavelength, spectrum, or modulation format conversion capability. On the other hand, the survivable virtual node embedding with shared protection problem needs to map working and backup virtual nodes over distinct physical nodes while sharing backup computing resources.

Cloud service embedding with shared protection includes working and backup virtual node embedding and working and backup virtual link embedding. Since physical node and fiber link resources are shared among multiple virtual nodes and virtual links of cloud demands, an embedding procedure needs to ensure an isolation of these resources while maintaining the resource capacity constraints. The procedure needs to ensure that the resources allocated to a cloud demand cannot be occupied by the other cloud demands (isolation). On the other hand, the cumulative resources occupied by all cloud demands must not exceed the total capacity of physical resources (capacity constraint). When mapping working and backup virtual nodes over physical nodes, a procedure needs to ensure that working and backup nodes cannot be mapped on the same physical node. When mapping working and backup virtual links over physical routes through optical channels in flex-grid transport SDN, a procedure needs to ensure the wavelength continuity, and spectral continuity, as well as avoid spectral conflict constraints. The wavelength continuity constraint is defined as an allocation of spectrum at the same operating wavelength on all links along the route of an optical channel. The spectral continuity constraint is defined as an allocation of the same amount of spectrum on all links along the route of an optical channel. The spectral conflict constraint is defined as an allocation of non-overlapping spectrum to all channels routed through the same fiber. Furthermore, a procedure also needs to make sure that the selection of a modulation format for a virtual link must support at least the physical distance of the physical route on which the virtual link is mapped. The constraint is referred to as the reachability constraint. The physical routers on which working and backup virtual links are mapped must be node-disjoint to ensure the resiliency in case of failures of data centers, ROADMs, or fibers. Backup virtual node resources can be shared among working virtual nodes as long as the working virtual nodes are physically node disjoint. Similarly, backup link resources can be shared among backup virtual links if the corresponding working virtual links are routed over physically node disjoint routes.

A description will now be given of a method for cloud service embedding with shared protection, accordance with an embodiment of the present principles. The method is then further described with respect to the flowchart of FIGS. 2-6.

The procedure first maps working and backup virtual nodes (VNs) over physical nodes (PNs) while performing load balancing over the PN resources. A VN is selected one-by-one in a descending order of the average requested computing resources. For the selected VN, a set of PNs are searched, which have at least the requested number of computational resources of each type. From this set, a PN is selected for the mapping of the working virtual node, which has the maximum average ratio of available to offered computing resources of the requested types, and on which none of the working or backup virtual nodes is yet mapped. The procedure repeats the above method until all working VNs of the cloud demand are mapped. Since the working VNs are mapped over different PNs in the above procedure, the resources for respective backup VNs can be shared. Thus, the number of required resources of each type at a backup VN is equivalent to the maximum number of requested resources of each type at VNs of the cloud demand. The procedure finds a set of PNs that include at least the required number of resources for the backup VN, and on which none of the working VNs of the cloud demand is yet mapped. Among this set, a PN is selected for the mapping of the backup VN, whose cumulative shortest path distance from the PNs on which working VNs of the cloud demand are mapped is minimum. If at least one of the working or backup VNs cannot be mapped due to the lack of resources, then the cloud demand is blocked.

After mapping VNs, the procedure maps working and backup virtual links (VLs) over physical links (PLs) while performing load balancing of spectral resources. To map a working VL between the working VNs, the procedure first finds the probability of mapping the working VL over each of the K-shortest routes using each modulation format. Among routes that are node-disjoint to the routes on which working VLs of the cloud demand are already mapped, a route and a modulation format are selected, which has the maximum probability of mapping the working VL. If such route does not exist, then among the K-shortest routes, the procedure selects a route and a modulation format that maximizes the probability of mapping the working VL. Thus, to enable sharing of backup resources among backup VLs of the working VLs, the procedure maps working VLs over physically node-disjoint routes with higher probability.

The procedure maps the backup VL of a working VL in two segments; each segment starts from one of the physical nodes on which the end nodes of the working VL is mapped and ends at the physical node on which the backup VN is mapped. The route of each segment is determined by finding a shortest path on the auxiliary graph. The procedure constructs an auxiliary graph by first removing PLs and PNs on which the working VL is mapped. Next, the procedure assigns a low cost to those physical links on which spectrum assigned to the already established backup VLs can be shared, and a higher cost to the rest of the physical links. A segment of the backup VL under consideration can share spectrum with the existing backup VLs, if their corresponding working VLs satisfies the following conditions: (1) if the physical routes of working VLs are node-disjoint to the physical route of the working VL currently under consideration; (2) one of the end nodes of the working VLs belonging to the same cloud demand is also the start node of the segment; (3) none of the end nodes of the working VLs belonging to the different cloud demand is the start node of the segment. In the next step, the procedure selects a spectrum efficient modulation format that meets the transmission reach requirement of the segment's found route. Next, the procedure finds spectrum required for the selected modulation format over the selected route such that spectrum sharing can be maximized with existing backup resources.

FIGS. 2-6 show an exemplary method 200 for cloud service embedding with shared protection in a software-defined flexible-grid optical transport network, in accordance with an embodiment of the present principles.

At step 201, arrange VNs in a descending order of the total requested different types of resources.

At step 202, select a VN from the top of the list, and find a set of PNs on which none of the working or backup VNs from the given cloud demand is yet mapped, and that include at least the requested number of resources for different types.

At step 203, check whether or not the set of PNs is empty. If the set of PNs is not empty, then the method proceeds to step 204. Otherwise, the method proceeds to step 230.

At step 204, map the corresponding working VN to a PN that maximizes the cumulative ratio of the number of available resources to the offered number of resources for each resource type.

At step 205, check whether all working VNs of the cloud demand are mapped. If at least one of the working VNs is not yet mapped, then the method returns to step 202. Otherwise, the method proceeds to step 206.

At step 206, find the required number of resources of each type at a backup VN, which is equivalent to the maximum number of requested resources of each type at the VNs of the cloud demand.

At step 207, find a set of PNs that include the required number of resources for the backup VN.

At step 208, select a PN from the found set of PNs to which none of the working VNs is yet mapped, and the PN having the minimum cumulative shortest path distance from the PNs on which working VNs are mapped.

At step 209, check whether the backup VN of the cloud demand is mapped. If the procedure cannot map the backup VN, then the procedure follows step 230, otherwise the procedure follows step 210.

At step 210, for each VL (i, j), based on the shortest distance $h_{ij}$ between PNs on which VNs i and j of the VL are mapped, find a modulation format that requires optimum spectrum $A_{ij}$ and meets the reachability constraint.

At step 211, arrange VLs (i, j) in a descending order based on a function $f_{ij}=(A_{ij}*h_{ij})$.

At step 212, select a VN (i, j) from the top of the list, and determines a set of feasible modulation formats $M_{ij}^k$ for each of the k-shortest routes connecting PNs on which VNs i and j are mapped based on their reachability requirements and the requested line rate.

At step 213, find a bit-map of each of the k-shortest routes connecting PNs on which i and j VNs are mapped. A bit-map of a route is determined by performing bit-wise logical end operations on the bit-maps of all physical links along the route.

At step 214, for each modulation format M of $M_{ij}^k$, determine the total required spectrum $S_{ij}^{km}$.

At step 215, determine a probability $P_{ij}^{km}$ of mapping the VL (i, j) on a route k using a modulation format in, where $P_{ij}^{km}$ is the ratio of the number of spectrum slots starting from which $S_{ij}^{km}$ amount of spectrum is available for a modulation format in on the bit-map of a route k to the total number possible spectrum slots starting from which $S_{ij}^{km}$ amount of spectrum can be mapped.

At step 216, among the routes that are node-disjoint to the routes on which working VLs of the cloud demand are already mapped, select a route k and modulation format in that has the maximum $P_{ij}^{km}$ for the VL (i, j). If such route does not exist, then among all k-shortest path routes, select a route and a modulation format that has the maximum $P_{ij}^{km}$ for the VL (i, j).

At step 217, check whether $P_{ij}^{km}$ is zero. If so, then the method 100 proceeds to step 230. Otherwise, the method proceeds to step 218.

At step 218, find the lowest spectrum slot starting from which $S_{ij}^{km}$ amount of spectrum is available for the selected m and k, and provision the VL at the found spectrum slot on the selected route k between PNs at which i and j are mapped.

At step 219, check whether all VLs are provisioned. If at least one of the VLs is not yet provisioned, then the method returns to step 212. Otherwise, the method proceeds to step 220.

At step 220, select a VL (i, j) from the top of the list for which the backup VL is not yet found.

At step 221, find a backup VL in two segments, where each segment starts from one of the end nodes of the VL and terminates at the backup VN of the cloud demand. Select an end node (either i or j) that is not yet considered.

At step 222, construct an auxiliary graph by first removing PLs and PNs on which the corresponding working VL is mapped. Next, assign a low cost to those physical links on which spectrum for the existing backup VLs can be shared, and a higher cost to the rest of the physical links. A segment of the backup VL can share spectrum with the existing backup VLs, if their corresponding working VLs satisfies the following conditions: (1) if the physical routes of the working VLs are node-disjoint to the physical route of the working VL (i,j); (2) one of the end nodes of the working VLs belonging to the same cloud demand is also the start node of the segment; and (3) none of the end nodes of the working VLs belonging to the different cloud demand are the start node of the segment.

At step 223, find a shortest route in the auxiliary graph between the selected end node of the VL and the backup VN, and select a spectral efficient modulation format based on the reachability requirement.

At step 224, find spectrum required for the selected modulation format over the selected route such that spectrum sharing can be maximized with existing backup resources.

At step 225, check whether spectrum for the segment of the backup VL is found. If spectrum for the segment of the backup VL cannot be found, then the method proceeds to step 226. Otherwise, the method proceeds to step 227.

At step 226, block the cloud demand and release the pre-allocated resources.

At step 227, provision the found spectrum for the segment of the backup VL.

At step 228, check whether all end nodes of the VL have been considered. If at least one of the end nodes is not yet considered, then the method returns to step 221. Otherwise, the method proceeds to step 229.

At step 229, checks whether all VLs have been considered. If at least one of the VLs is not yet considered, then the method returns to step 220. Otherwise, the method is terminated.

At step 230, block the cloud demand and release the pre-allocated re-sources.

A description will now be given of some of the many attendant competitive/commercial values of the present principles.

One such value is that the procedure is applicable as an application in optical control planes, such as Path Computation Element (PCE) or Software-Defined Network (SDN) Controller, Another such value is that the application of this procedure can embed the maximum number of cloud demands, and thus, enhance network performance. Yet another such value is that the procedure can minimize the blocking of cloud demands in networks.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method for embedding cloud demands with shared protection in a software-defined flexible-grid optical transport network, the method comprising:
    in an optical transport software defined network having flexibility and programmability in transmission and switching network elements including transponders and reconfigurable optical add-drop multiplexers (ROADMs);
    managing optical channels with flexible-grid channel mapping;
    extracting control plane intelligence from a physical hardware to an optical-defined controller;
    mapping working virtual nodes of the cloud demands over physical nodes of the network;
    mapping backup virtual nodes of the cloud demands over the physical nodes;
    mapping working virtual links of the cloud demands over physical routes of the network;
    mapping backup virtual links of the cloud demands over the physical routes,
    wherein said mapping steps are performed by the optical-defined controller including a processor, and
    wherein the physical routes comprise node-disjoint physical routes and non-node-disjoint physical routes, and said step of mapping working virtual links over physical routes comprises mapping the working virtual links over the node-disjoint physical routes with a higher probability than over the non-node-disjoint physical routes to maximize sharing of backup resources among the backup virtual links.

2. The method of claim 1, wherein the working virtual nodes are mapped over the physical nodes for computing resource load balancing.

3. The method of claim 1, wherein a given one of the working virtual nodes is mapped to a given one of the physical nodes that maximizes a cumulative ratio of an amount of available computing resources to an amount of offered computing resources for each of a plurality of computing resource types.

4. The method of claim 1, wherein said step of mapping the working virtual nodes comprises:
    arranging the working virtual nodes in a descending order of a total amount of requested different types of resources; and
    evaluating the working virtual nodes for mapping over the physical nodes in the descending order.

5. The method of claim 1, wherein said step of mapping the backup virtual nodes comprises mapping a given one of the backup virtual nodes to a given one of the physical nodes having a cumulative shortest path distance from remaining ones of the physical nodes on which working virtual nodes are mapped.

6. The method of claim 1, wherein the backup virtual nodes are mapped over the physical nodes to enable sharing among corresponding ones of the working virtual nodes that are node disjoint.

7. The method of claim 1, wherein the backup virtual nodes are mapped over the physical nodes responsive to an available amount of spectrum for a given optical data modulation format.

8. The method of claim 7, wherein the given optical data modulation format is determined responsive to a reachability constraint.

9. The method of claim 1, wherein the backup virtual links are mapped over the physical routes such that spectral resource sharing is maximized.

10. The method of claim 1, wherein the backup virtual links are mapped over the physical routes responsive to a given optical data modulation format determined based on a reachability requirement.

11. The method of claim 1, wherein the backup virtual links are mapped over the physical routes to enable sharing among corresponding ones of the working virtual links that are node disjoint.

12. A non-transitory article of manufacture tangibly embodying a computer readable program which when executed causes a computer to perform the steps of claim 1.

13. An apparatus for embedding cloud demands with shared protection in a software-defined flexible-grid optical transport network, the apparatus comprising:

an optical-defined controller with an optical transport software defined network having flexibility and programmability in transmission and switching network elements including transponders and reconfigurable optical add-drop multiplexers ROADMs having a processor configured to:
managing optical channels with flexible-grid channel mapping;
extracting control plane intelligence from a physical hardware to the optical-defined controller;
map working virtual nodes of the cloud demands over physical nodes of the network;
map backup virtual nodes of the cloud demands over the physical nodes;
map working virtual links of the cloud demands over physical routes of the network;
map backup virtual links of the cloud demands over the physical routes, and
wherein the physical routes comprise node-disjoint physical routes and non-node-disjoint physical routes, and the working virtual links are mapped over the physical routes by mapping the working virtual links over the node-disjoint physical routes with a higher probability than over the non-node-disjoint physical routes to maximize sharing of backup resources among the backup virtual links.

14. The apparatus of claim 13, wherein the working virtual nodes are mapped over the physical nodes for computing resource load balancing.

15. The apparatus of claim 13, wherein a given one of the working virtual nodes is mapped to a given one of the physical nodes that maximizes a cumulative ratio of an amount of available computing resources to an amount of offered computing resources for each of a plurality of computing resource types.

16. The apparatus of claim 13, wherein the working virtual nodes are mapped by arranging the working virtual nodes in a descending order of a total amount of requested different types of resources, and evaluating the working virtual nodes for mapping over the physical nodes in the descending order.

17. The apparatus of claim 13, wherein the backup virtual nodes are mapped by mapping a given one of the backup virtual nodes to a given one of the physical nodes having a cumulative shortest path distance from remaining ones of the physical nodes on which working virtual nodes are mapped.

18. The apparatus of claim 13, wherein the backup virtual nodes are mapped over the physical nodes to enable sharing among corresponding ones of the working virtual nodes that are node disjoint.

* * * * *